June 24, 1947.  A. F. HABENICHT  2,422,895
PRESSING APPARATUS
Filed July 20, 1944  3 Sheets-Sheet 1

Inventor:
August F. Habenicht,
By Dawson, Ooms & Booth,
Attorneys.

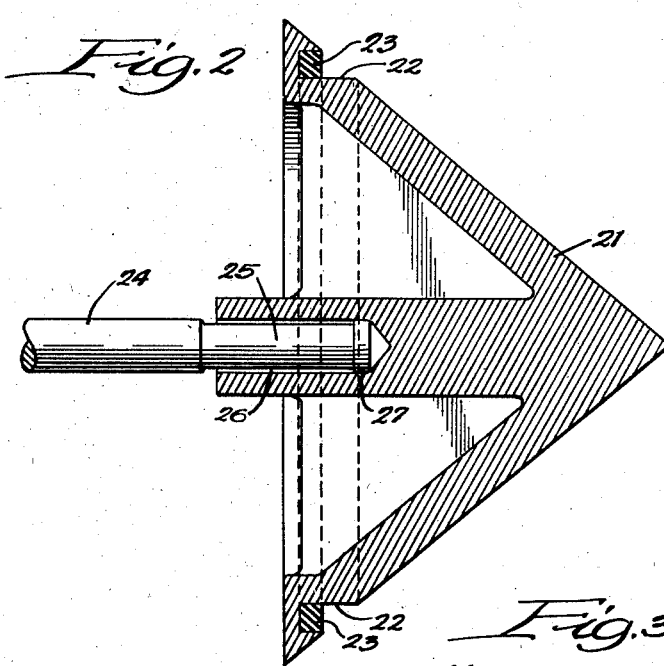
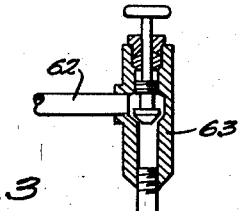
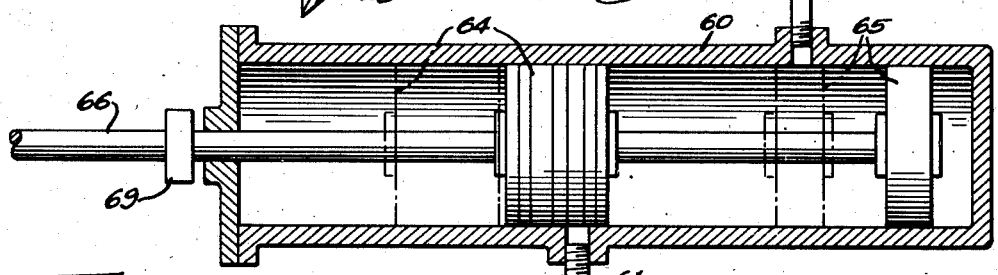
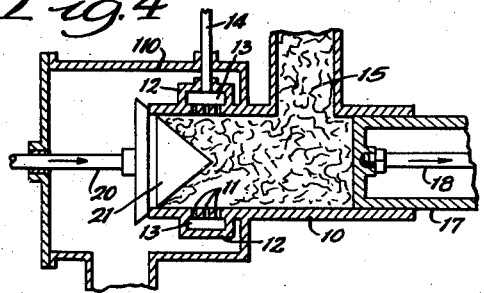
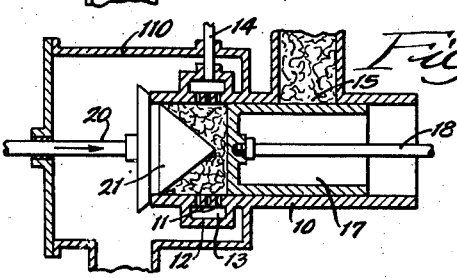

June 24, 1947.  A. F. HABENICHT  2,422,895
PRESSING APPARATUS
Filed July 20, 1944  3 Sheets-Sheet 3

Inventor:
August F. Habenicht
By Dawson, Ooms & Booth,
Attorneys

Patented June 24, 1947

2,422,895

UNITED STATES PATENT OFFICE 2,422,895

PRESSING APPARATUS

August F. Habenicht, Tinley Park, Ill.

Application July 20, 1944, Serial No. 545,803

7 Claims. (Cl. 100—50)

This invention relates to pressing apparatus useful for separating liquid from solid matter. The invention is especially useful in pressing pulpy or mushy matter to expel the liquid therefrom.

An object of the invention is to provide a pressing device which is automatically operable in response to fluid pressure to press the matter and recover the liquid and solids separately. Another object is to provide a device wherein the matter is pressed in a cylinder to form a cake and which is provided with mechanism for breaking up the cake within the cylinder and discharging the pressed solid matter from the cylinder to permit further quantities of matter to be pressed in the continued operation of the machine.

A further object is to provide hydraulic apparatus for actuating the pressing mechanism, and also for actuating the means for breaking up the cake. Another object is to provide hydraulic control mechanism for automatically timing the operation of the cake-expelling means in accordance with the operation of the pressing mechanism. Another object is to provide reciprocating pressing mechanism and means for controlling the operation thereof which will check its speed of movement to facilitate the entrance of a fresh charge of matter to be pressed. Another object is to provide control means for regulating the pressure applied to the means for breaking up the cake so as to permit it to retract during a portion of the pressing cycle and to advance with full force at a time when an operation by the pressing mechanism is completed.

Other objects of the invention will be apparent after the following detailed description.

One embodiment of the invention is illustrated in the accompanying drawings, in which—

Figure 1:
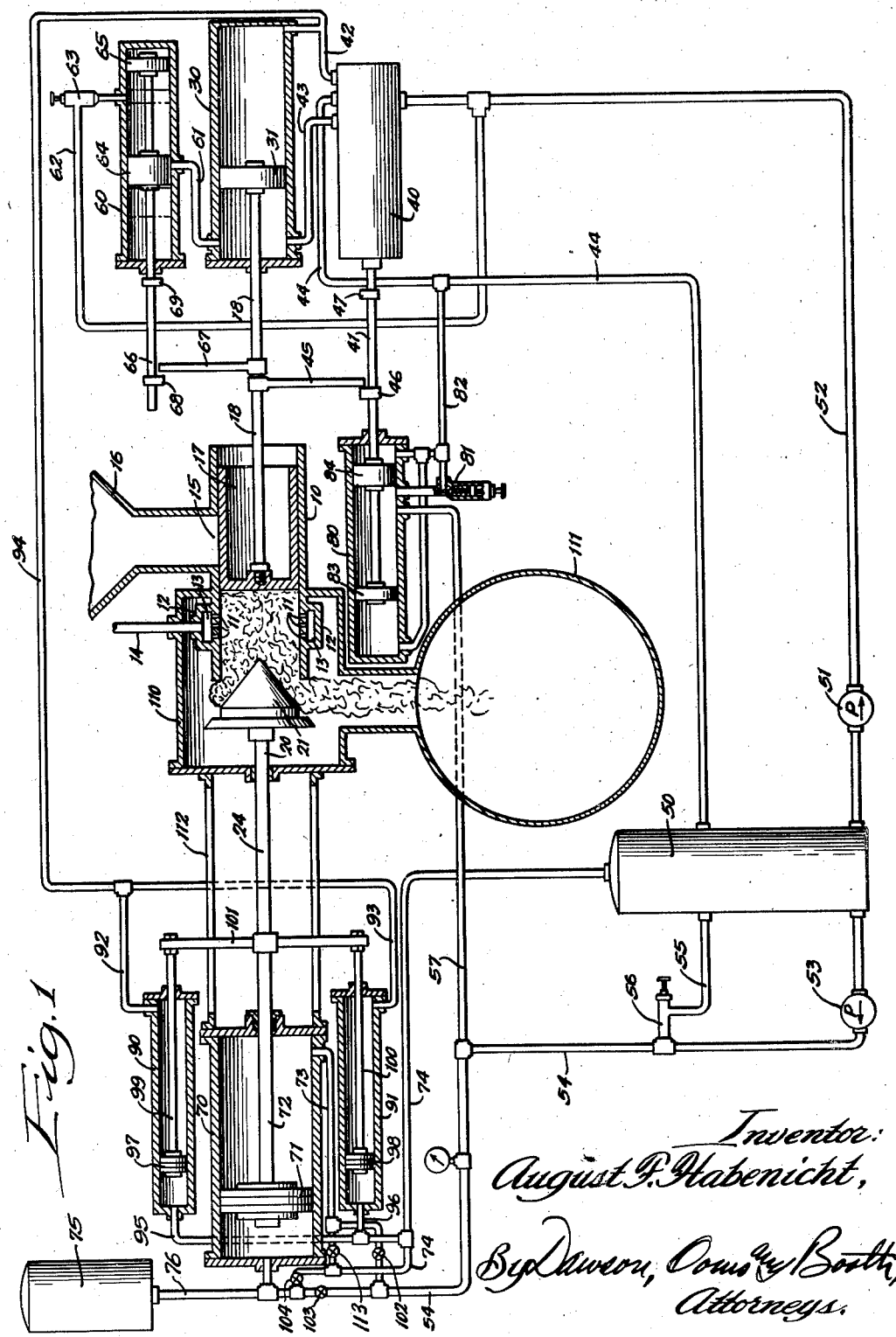
Figure 7:
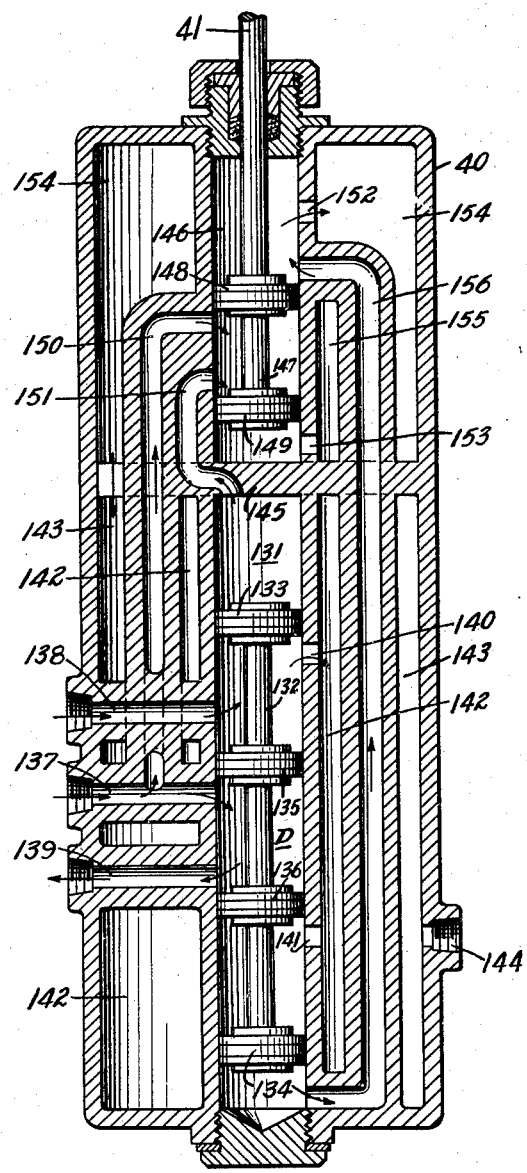

Fig. 1 is a schematic showing of the improved device, certain of the parts being shown in cross section to more clearly demonstrate their operation; Fig. 2 is an enlarged view in cross section of the piston head employed for breaking up the pressed cake; Fig. 3 is an enlarged view in cross section of the control cylinder for regulating the speed of rearward travel of the reciprocating pressing piston; Fig. 4 is a sectional view of the pressing cylinder and accompanying mechanism in position for the inlet of matter to be pressed, the pressing piston being in rearward motion toward the end of its stroke; Fig. 5 is a view similar to Fig. 4 but showing the mechanism during the pressing stroke; Fig. 6 is a view similar to Figs. 4 and 5 but showing the mechanism in the position it assumes after the cake has been broken up and discharged after the pressing stroke is completed and the cake is broken up and discharged from the cylinder; and Fig. 7, a longitudinal sectional view of the control device adapted to apply pressure through first one conduit and then another.

As illustrated, the improved apparatus includes a cylinder 10 which may be of any desired size or specific shape. Preferably, this cylinder should be circular in cross section, though if desired it may be of any other desired shape. One portion of the wall has the perforations 11 through which the liquid from the pressing operations is withdrawn from the cylinder. The auxiliary wall 12 forms with the wall of the cylinder a chamber 13 for receiving the liquid from the perforations. A tube 14 connects with the chamber 13 and serves to convey the separated liquid from the device.

Near the rear end of the cylinder 10 at the top side is an inlet opening 15 which connects with the hopper 16 directly above.

A piston 17 is disposed in the rearward end of the cylinder 10 and adapted for movement forward and back across the inlet opening. The rod 18 of this piston is connected with hydraulic mechanism, which will later be described, for actuating this piston in its reciprocating movement.

In the following specification, the left side of each cylinder referred to shall be referred to as the forward side and the right side of every cylinder shall be referred to as the rear side.

At the forward end of the cylinder 10 is a second piston 20 having the conical head 21. The end of the suction or rearward stroke is here considered the start of operations and at this time the head is urged tightly up against the end of the cylinder in the manner indicated in Fig. 4 of the drawings. As more clearly illustrated by Fig. 2, this head is conical in shape and near its outer rim is provided with a recess 22 in which is fitted a resilient sealing member 23 formed of rubber or other resilient material. When the head is urged tightly against the end of the cylinder, this sealing member fits against the end of the cylinder wall and prevents leakage when the matter to be pressed is first introduced into the cylinder. Though the head 21 is preferably in the form of a circular cone, other specific surfaces may be employed, it being necessary to have the forward portion of the head enter the cylinder for breaking up the cake while at the same time leaving an opening through which the broken up cake may be discharged.

Again referring to Fig. 2 of the drawings, it is a further feature that the piston rod 24 has its end portion 25 extending into a slightly enlarged bore 26 of the central portion of head 21. The tip of the portion 25 is slightly enlarged at 27 to fit the bore 26. This connection permits the head 21 to pivot slightly on the rod so that as it is pressed rearwardly against the end of the cylinder it may find its own center and avoid the possibility of an imperfect contact against the cylinder.

The piston 17 is driven in reciprocating movement by hydraulic mechanism, including the cylinder 30. The piston 31 inside the cylinder 30 is connected by the rod 18 to the piston 17, and fluid pressure applied on one side of the piston 31 serves to drive piston 17 forwardly while pressure on the other side serves to drive piston 17 rearwardly.

Fluid to the cylinder 30 is supplied by the control device 40. This device may be of the structure specifically described in my co-pending application Serial No. 531,742, or of any other specific structure which is operated through fluid pressure and adapted to apply pressure first through one conduit and then through another, the shift of pressure from one conduit to the other being determined by the position of the piston 31. The control device is described in detail hereinafter.

As here illustrated, the fluid utilized for driving the mechanism is forced from the tank 50 by the pump 51 through line 52 to the device 40. From the device 40, the fluid may be passed through the conduit 42 to the rear end of the cylinder 30 where it serves to advance the piston 31. The fluid forward of piston 31 may return through the conduit 43 to the device 40 and thence through conduit 44 back to the source tank 50. The fluid takes the circuit just described when the rod 41 of the device 40 is in its rearward position, as shown in Fig. 1. When this rod is in its forward position, the fluid passes under pressure from the device 40 through the conduit 43 to the forward end of the cylinder 30 and so tends to push the piston 31 rearwardly, the fluid behind the piston 31 being passed back through the conduit 42 to the device 40 and thence back through conduit 44 to the source tank 50.

The position of the rod 41 is determined through contact of the side arm 45 attached to the rod 18 with the blocks 46 and 47 attached to the rod 41. On the forward stroke of the piston 17, the arm 45 engages the block 46 to urge the rod 41 to its forward position, and on the rearward stroke of the piston 17 the arm 45 engages the block 47 to urge the rod 41 back to rearward position.

An auxiliary cylinder 60 is provided for regulating the speed of withdrawal of the piston 17 to permit time for a fresh amount of pulp or other matter to be pressed to fall down from the hopper 16 into the cylinder 10 through the inlet 15. This cylinder 60 is connected by the conduit 61 with the forward portion of the cylinder 30, and also is connected through the conduit 62 with the low pressure return mains to the source tank 50 or other place of disposition. Controlling the flow through the conduit 62 is a valve 63 which can be adjusted to permit only a desired amount of liquid to flow therethrough.

Inside the cylinder 60 are the pistons 64 and 65 mounted on the rod 66. In the rearward position of the rod 66, as shown by solid lines in Fig. 3, the piston 64 blocks off the conduit 61; and in the forward position of the rod, as shown in dotted lines Fig. 1, the section of the cylinder communicating with the conduit 61 is blocked from admission to the conduit 62 by the piston 65. However, at intermediate positions of the rod 66, there is communication between conduits 61 and 62 through the cylinder 60.

The position of the rod 66 is governed through contact of the arm 67 attached to the rod 18 with the blocks 68 and 69 attached to the rod 66. Thus, when the piston 17 is moved forwardly near the end of its stroke, the rod 66 is moved forwardly, and when the piston 17 is moved rearwardly near the end of its stroke, the rod 66 is moved rearwardly.

The piston 20 having head 21 is urged rearwardly against the end of the cylinder 10 through action of the hydraulic cylinder 70. It will be observed from Fig. 1 that this cylinder 70 is larger and therefore stronger than the hydraulic cylinder 30 which operates the pressing piston. The unit pressures developed by pumps 51 and 53 are approximately equal but for the same unit driving pressure admitted to each cylinder and with the same lower unit pressure on the discharges, the total thrust exerted by the piston rod of cylinder 70 is greater than the total thrust exerted by the piston rod of cylinder 30. The fluid for operating the cylinder 70 is pumped by the pump 53 from the tank 50 through the conduit 54 into the forward end of the cylinder 70. The pressure of this fluid urges the piston 71 and rod 72 rearwardly, and the fluid behind the piston 71 in cylinder 70 passes through the conduits 73 and 74 back to the tank 50. An air chamber for equalizing the fluid pressure applied to the cylinder 70 is provided in the tank 75 which is connected to the pressure line by conduit 76. The conduit 55 and valve 56 provide a manually-operated by-pass for controlling the pressure delivered to the cylinder 70.

An automatic by-pass during a portion of the operation cycle is provided by the conduit 57, the cylinder 80, the valve 81 and the return conduits 82 and 44. The pistons 83 and 84 are mounted on the rod 41 and are so spaced that when the rod 41 is in its rearward position, as shown in Fig. 1, there will be communication between the conduit 57 and the conduit 82 through the cylinder 80 and the valve 81, but when this rod is in its forward position, this fluid path is blocked.

Another factor controlling the operation of this piston 71 includes the cylinders 90 and 91. The rearward end of each of these cylinders is connected through conduits 92, 93 and 94 with the conduit 42 leading to the rearward portion of the cylinder 30. The forward end of the cylinders 90 and 91 is connected through conduits 95, 96 and 74 with the source tank 50. It will be seen that pressure applied through the conduits 94, 92 and 93 to the rearward sides of the pistons 97 and 98 of the cylinders 90 and 91 will urge the rods 99 and 100 forwardly. Since the rods 99 and 100 are connected to the rod 24 of cylinder 70 through the cross member 101, it will be apparent that pressure so applied to cylinders 90 and 91 will tend to counteract the pressure applied to the forward side of the piston 71 in the effect on piston 20.

The entire forward end of the pressing cylinder 10 may be enclosed by the casing 110, and the rod 24 may be journaled in this casing. Below the casing 110 and communicating therewith is a container 111 into which the pressed discharged solid matter may be received and held. For structural security, the cylinder 70 and the casing 110 may be joined by the cylindrical member 112 which contains slots at top and bottom to permit operation of the cross member 101.

The control member 40 heretofore referred to is operated through fluid pressure and is adapted to apply pressure first through one conduit and then the other, the shift of pressure from one conduit to the other being determined by the position of the piston 31 which communicates through pipe conduit 43 with the member 40.

In the control device 40, the casing houses the shifting and control mechanisms and serves to connect the fluid pressure delivered by the pump 51 to one or another of the conduits 42 and 44 according to the position of the shifting mechanism.

The member 40 has a central cylinder 131 in the lower portion thereof, and in this cylinder is the piston 132 having the top head 133 and the bottom head 134, and the intermediate spaced dividers 135 and 136. This piston and cylinder are parts of the shiftable mechanism indicated by the letter D. The passage 137 with which the conduit 44 is connected leads into the central portion of the cylinder 131. A second passage 138, above passage 137, leads into the cylinder 131, and this passage is adapted to be connected with the conduit 43. A third passage 139 below the inlet passage 137 leads into the cylinder 131 and this passage is adapted to be connected with the conduit 42. The outer passages 140 and 141 through the wall of the cylinder 131 lead into the cavity 142 which is connected with the cavity 143. The cavity 143 leads to the outlet 144 adapted to be connected to conduit 52.

Above the cylinder 131 and separated therefrom by the wall 145 is a second cylinder 146. Within this second cylinder is a piston 147 provided with the fitted dividers 148 and 149. An inlet to this cylinder 146 is provided by the passage 150 which communicates at its one end with the inlet passage 137 and which communicates with cylinder 146 at its other end. A passage 151 connects the cylinder 146 with the upper portion of the cylinder 131. Passages 152 and 153 through the wall of the cylinder 146 lead to the cavities 154 and 155 respectively, which cavities are in communication with the cavities 143 and 142 at the lower portion of the casing and in this way lead to the general outlet 144. The passage 156, which at its upper end communicates with the cylinder 146, communicates at its lower end with the lower end of the cylinder 131.

In the operation of the improved device, the matter to be pressed may be placed in the hopper 16 and the fluid pumps started, and from thence onward the operation is entirely automatic.

Beginning with the withdrawal of the pressing piston 17 past the inlet 15, as illustrated in Fig. 4, it may be seen that the matter to be pressed may fall down from the hopper 16 into the cylinder forward of the piston 17. With the piston 17 at the end of its rearward stroke, the rods 41 and 66 are moved to their rearward positions, pressure is then applied through conduit 42 to the rear of the piston 31 to begin the forward stroke of the piston 17. At the same time, conduit 57 is in communication with the by-pass line 82 through cylinder 80 and valve 81, thus reducing the pressure which is applied through operation of the pump 53 to the forward side of the piston 71 in cylinder 70. Also, pressure is applied through conduits 94, 92 and 93 to the rear sides of the pistons 97 and 98 in cylinders 90 and 91 respectively. The effect of this pressure applied to cylinders 90 and 91 along with the effect of the by-pass through cylinder 80 serves to reduce the force which is urging the piston 20 against the pressing cylinder 10. With these conditions obtaining, the piston 17 is moved positively forward through actuation by the hydraulic cylinder 30, and the matter begins to be pressed within cylinder 10 with the liquid being expelled through the apertures 11 and out through the conduit 14. Since the force urging the piston 20 against the cylinder is at this time much reduced through the action of cylinders 90 and 91 and the by-pass through cylinder 80, the piston 20 yields under pressure of the pressed matter and moves to the position shown in Figs. 1 and 5.

As the pressing piston 17 advances further, the arms 45 and 67 come into contact respectively with the blocks 46 and 68, thus moving the rods 41 and 66 to their forward positions. This operates to block the communication through the cylinder 80, thus shutting off the pressure by-pass, and at the end of the piston stroke the pressure from the device 40 will be shifted to throw fluid to the forward side of the piston 31. At the same time, the pressure through conduits 94, 92 and 93 is cut off, thus relieving the effect of the cylinders 90 and 91. Both the shutting of the by-pass and the relief of pressure in cylinders 90 and 91 serves to increase the force which is applied to the piston 20, and as a result this piston is urged against the pressure cylinder 10 with great force. As the piston head 21 moves into the cylinder, its point pushes into the cake which has been formed as a result of the operation of piston 17, and so breaks up the cake, causing the crumbs to pass along the inclined surface of the cone and out the end of the cylinder, falling down into the container 111. The piston 20 and its conical head then comes to the position illustrated in Fig. 6 of the drawings.

With the piston 20 in close contact with the end of the cylinder 10, as shown in Fig. 6, the piston 17 begins its rearward stroke. At the beginning of the rearward stroke, there is no communication between the forward end of the cylinder 30 and the conduit 62 through the cylinder 60, since the piston 65 blocks communication with conduit 62. But after the piston 17 has moved rearwardly substantially across the inlet 15, the arm 67 comes into contact with the block 69 and during the rearward stroke of the rod 66, communication is established between the forward end of the cylinder 30 and the conduit 62 through the cylinder 60 and the valve 63. The opening of this by-pass causes substantially less fluid to be effective in moving the piston 31 and consequently the piston 17. Therefore, the piston 17 will be moved much more slowly while this by-pass is in effect. This slackening of speed permits time for a fresh quantity of matter to be pressed to fall down from the hopper 16 into the cylinder 10 in front of the piston 17. At the end of the rearward stroke, the rod 66 will be brought to the position shown in Fig. 1 in which the piston 64 blocks the by-pass. At this time the speed of the actuating piston will be resumed.

Following the cycle of operation with respect to the matter being pressed, it will be seen that the material falls from the hopper into the cylinder 10 in front of the piston 17. Upon the forward movement of the piston 17, the material which has entered the cylinder is pressed forwardly and against the head 21 causing the head to yield the matter being compressed between the two piston means into a form of cake, the liquid being separately withdrawn through the perforations 11. This somewhat stiffly pressed cake will not move from the cylinder of its own accord and is broken up and ejected through operation of the piston 20. When the pressing piston 17 is approximately at the forward end of its stroke, the piston 20 is actuated by strong force to push the point of the conical head 21 into the center of the pressed cake. This serves to break up the cake and to crumble the pieces along the inclined surface of the cone and out of the cylinder. The dry crumbs so ejected from the cylinder fall down into the container where they may be recovered and removed after a sufficient amount has been accumulated.

After the pressing stroke, the piston 17 may move rapidly under fluid pressure to withdraw to a position for taking on a fresh quantity of matter to be pressed. After it has withdrawn to a point where the fresh matter may fall down from the hopper 16 into the cylinder in front of it, the speed of travel decreases substantially to permit time for taking in the new load. Then at the end of the rearward stroke of piston 17, the original speed is resumed and the same operation is repeated.

Thus, it is apparent that the whole operation is automatic and each of the operations take place in their proper sequence, the action of all moving elements being coordinated with each other to accomplish the desired purpose without any manual attention.

Should it be desired to manually release the piston 20 for cleaning or for any other purpose, valve 102 may be opened, valve 103 closed, and valve 104 opened. This will operate to admit fluid pressure from conduit 54 through conduit 73 into the rearward end of the cylinder 70, and will permit liquid from the forward end of the cylinder to escape through the conduit 74 back to the tank source. Valve 113 may also be employed in the line communicating with conduit 73 for control, together with valve 102 of conduit 73.

Though only a single embodiment of the invention has been illustrated and described in detail, it will be apparent that many modifications may be constructed and many changes may be made without departing from the spirit of the invention.

I claim:

1. A press for separating liquid from solid matter, comprising a cylinder, an inlet through which said matter is introduced into the cylinder, an outlet through which said solid matter may pass from said cylinder after being pressed, means for withdrawing liquid from said cylinder as said matter is pressed therein, a piston adapted to press said matter forwardly in said cylinder from said inlet, a second piston adjacent said outlet and adapted to yield to pressure of said matter upon forward movement of said first-mentioned piston, means for driving said second piston rearwardly to force the pressed matter through said outlet, and means for actuating said last-mentioned means for operation when said first-mentioned piston is at approximately the forward end of its stroke.

2. A device as set forth in claim 1 wherein said second piston is adapted to close said outlet at the end of its rearward stroke.

3. A press for separating liquid from solid matter, comprising a cylinder, an inlet through which said matter is introduced into said cylinder, means for withdrawing liquid from said cylinder as said matter is pressed therein, a conical piston guarding the forward end of said cylinder, hydraulic means urging said piston rearwardly against the end of said cylinder, piston means for pressing said matter forwardly within said cylinder from said inlet, hydraulic means for driving said piston means in reciprocating movement so as to press successive amounts of said matter forwardly within said cylinder, and means including hydraulic connections associated with each of said hydraulic means for actuating said first-mentioned hydraulic means to drive said conical piston rearwardly when said second-mentioned hydraulic means has acted to urge said piston means to approximately the forward end of its stroke.

4. A press for separating liquid from solid matter, comprising means for compressing said matter into a cake to expel the liquid therefrom, said means including a reciprocating piston, a hydraulic cylinder operated by fluid pressure for driving said piston in reciprocating movement, means for breaking up the cake formed through operation of said compressing means and for discharging the pressed solid matter from said compressing means, means including a hydraulic cylinder operated by fluid pressure for actuating said means for breaking up the cake, and hydraulic control means for actuating said last-mentioned means when said piston has been driven to a predetermined position.

5. A press for separating liquid from solid matter, comprising means for compressing said matter into a cake to expel the liquid therefrom, said means including a reciprocating piston, a hydraulic cylinder operated by fluid pressure for driving said piston in reciprocating movement, means for breaking up the cake formed through operation of said compressing means and for discharging the pressed solid matter from said compressing means, means including a hydraulic cylinder operated by fluid pressure for actuating said means for breaking up the cake, and hydraulic control means for actuating said last-mentioned means when said piston has been driven to a predetermined position, said means for breaking up the cake including in addition to said actuating hydraulic cylinder hydraulic means for withholding the full force of said actuating cylinder until said piston has reached a predetermined position in its reciprocating movement.

6. Apparatus as set forth in claim 5 wherein said last-mentioned means includes a fluid by-pass for reducing the fluid pressure on said actuating cylinder until said piston has reached a predetermined position in its reciprocating movement.

7. A press for separating liquid from solid matter, comprising a cylinder in which the matter may be pressed, said cylinder containing an inlet for said matter, a piston in said cylinder and adapted for reciprocating movement across said inlet, means for withdrawing liquid from said cylinder as it is expelled from said matter in the pressing operation, said piston being adapted through its reciprocating movement to press matter entering said inlet into a cake within said cylinder, means including a head having an inclined surface for entering said cylinder to break up and discharge the pressed solid matter, means for urging said head rearwardly against said cylinder with sufficient force to break the cake formed in the pressing operation, withholding means for reducing the force applied by said urging means during at least a portion of the forward stroke of said piston whereby said head is permitted to yield under pressure of the matter being pressed, and control means for rendering said withholding means inoperative when said piston is approximately the forward end of its stroke.

AUGUST F. HABENICHT.

REFERENCES CITED

The following references are of record in the file of this patent:

UNITED STATES PATENTS

| Number | Name | Date |
|---|---|---|
| 430,456 | Wright | June 17, 1890 |
| 1,004,214 | Stehlin | Sept. 26, 1911 |
| 1,538,167 | Chappell et al. | May 19, 1925 |
| 1,545,818 | Elfstrum et al. | July 14, 1925 |
| 731,734 | Anderson | June 23, 1903 |
| 837,010 | Vernsten | Nov. 27, 1906 |
| 332,718 | Lafferty | Dec. 22, 1885 |
| 585,800 | Toulouse et al. | July 6, 1897 |
| 1,851,191 | Lang | Mar. 29, 1932 |